US010706145B2

(12) United States Patent
Stopel et al.

(10) Patent No.: US 10,706,145 B2
(45) Date of Patent: Jul. 7, 2020

(54) RUNTIME DETECTION OF VULNERABILITIES IN SOFTWARE CONTAINERS

(71) Applicant: Twistlock, Ltd., Herzliya (IL)

(72) Inventors: Dima Stopel, Herzliya (IL); Ben Bernstein, San Francisco, CA (US)

(73) Assignee: TWISTLOCK, LTD., Herzliya (IL)

( * ) Notice: Subject to any disclaimer, the term of this patent is extended or adjusted under 35 U.S.C. 154(b) by 92 days.

(21) Appl. No.: 15/278,681

(22) Filed: Sep. 28, 2016

(65) Prior Publication Data
US 2017/0098071 A1    Apr. 6, 2017

Related U.S. Application Data

(60) Provisional application No. 62/235,644, filed on Oct. 1, 2015, provisional application No. 62/235,641, filed on Oct. 1, 2015.

(51) Int. Cl.
| | | |
|---|---|---|
| G06F 21/53 | (2013.01) | |
| G06F 21/55 | (2013.01) | |
| G06F 21/56 | (2013.01) | |
| G06F 21/51 | (2013.01) | |
| G06F 21/52 | (2013.01) | |

(52) U.S. Cl.
CPC ............ G06F 21/554 (2013.01); G06F 21/51 (2013.01); G06F 21/52 (2013.01); G06F 21/53 (2013.01); G06F 21/564 (2013.01); G06F 21/566 (2013.01)

(58) Field of Classification Search
CPC ............... H04L 63/1416; H04L 63/145; H04L 63/1408; H04L 63/1441; H04L 63/1458; G06F 21/53
See application file for complete search history.

(56) References Cited

U.S. PATENT DOCUMENTS

| | | |
|---|---|---|
| 6,490,620 B1 | 12/2002 | Ditmer et al. |
| 6,502,102 B1 | 12/2002 | Haswell et al. |
| 6,523,027 B1 | 2/2003 | Underwood |
| 6,704,873 B1 | 3/2004 | Underwood |

(Continued)

OTHER PUBLICATIONS

Linn, et al., "Protecting Against Unexpected System Calls", Department of Computer Science, University of Arizona, Tucson, AZ, 2005, url: https://www.usenix.org/legacy/events/sec05/tech/linn.html, pp. 239-254.

(Continued)

*Primary Examiner* — Ali S Abyaneh
(74) *Attorney, Agent, or Firm* — M&B IP Analysts, LLC

(57) ABSTRACT

A system and method for detecting vulnerabilities in software containers at runtime are provided. This method includes intercepting a request to instantiate a new software container in a first execution environment; creating a second execution environment; migrating the new software container from the first execution environment to the second execution environment for execution therein; monitoring the operation of the new software container in the second execution environment to detect at least one unauthorized action; and upon detection of the at least one unauthorized action, generating a detection event identifying at least a type of vulnerability associated with the detected unauthorized action.

25 Claims, 6 Drawing Sheets

(56) References Cited

U.S. PATENT DOCUMENTS

| | | | |
|---|---|---|---|
| 6,732,162 | B1 | 5/2004 | Wood et al. |
| 7,100,195 | B1 | 8/2006 | Underwood |
| 7,103,740 | B1* | 9/2006 | Colgrove ............... G06F 3/0605 |
| | | | 707/999.202 |
| 7,577,848 | B2 | 8/2009 | Schwartz et al. |
| 7,596,227 | B2 | 9/2009 | Illowsky et al. |
| 7,640,235 | B2 | 12/2009 | Shulman et al. |
| 7,698,741 | B2 | 4/2010 | Marinescu et al. |
| 7,743,420 | B2 | 6/2010 | Shulman et al. |
| 7,752,662 | B2 | 7/2010 | Shulman et al. |
| 7,752,669 | B2 | 7/2010 | Palliyil et al. |
| 7,779,468 | B1 | 8/2010 | Magdych et al. |
| 7,861,303 | B2 | 12/2010 | Kouznetsov et al. |
| 7,882,542 | B2 | 2/2011 | Neystadt et al. |
| 8,024,804 | B2 | 9/2011 | Shulman et al. |
| 8,051,484 | B2 | 11/2011 | Shulman et al. |
| 8,056,141 | B2 | 11/2011 | Shulman et al. |
| 8,108,933 | B2 | 1/2012 | Mahaffey |
| 8,135,948 | B2 | 3/2012 | Shulman et al. |
| 8,181,246 | B2 | 5/2012 | Shulman et al. |
| 8,302,192 | B1 | 10/2012 | Cnudde et al. |
| 8,316,237 | B1 | 11/2012 | Felsher et al. |
| 8,499,150 | B1 | 7/2013 | Nachenberg |
| 8,510,571 | B1 | 8/2013 | Chang et al. |
| 8,621,613 | B1 | 12/2013 | McClintock et al. |
| 8,639,625 | B1 | 1/2014 | Ginter et al. |
| 8,677,472 | B1 | 3/2014 | Dotan et al. |
| 8,756,683 | B2 | 6/2014 | Manion et al. |
| 8,806,625 | B1 | 8/2014 | Berger |
| 8,966,629 | B2 | 2/2015 | Sallam |
| 9,003,141 | B2 | 4/2015 | Nielsen et al. |
| 9,098,333 | B1 | 8/2015 | Obrecht et al. |
| 9,203,862 | B1 | 12/2015 | Kashyap et al. |
| 9,223,966 | B1* | 12/2015 | Satish .................... G06F 21/53 |
| 9,256,467 | B1 | 2/2016 | Singh et al. |
| 9,355,248 | B1 | 5/2016 | Wiest et al. |
| 9,401,922 | B1 | 7/2016 | Walters |
| 9,594,590 | B2* | 3/2017 | Hsu ...................... G06F 9/4856 |
| 9,904,781 | B2* | 2/2018 | Martini .................. G06F 9/455 |
| 9,928,379 | B1 | 3/2018 | Hoffer |
| 10,223,534 | B2 | 3/2019 | Stopel et al. |
| 10,333,967 | B2 | 6/2019 | Litva et al. |
| 2001/0007131 | A1 | 7/2001 | Galasso et al. |
| 2003/0014629 | A1 | 1/2003 | Zuccherato |
| 2003/0079145 | A1 | 4/2003 | Kouznetsov et al. |
| 2003/0120593 | A1 | 6/2003 | Bansal et al. |
| 2003/0229801 | A1 | 12/2003 | Kouznetsov et al. |
| 2003/0233566 | A1 | 12/2003 | Kouznetsov et al. |
| 2003/0233574 | A1 | 12/2003 | Kouznetsov et al. |
| 2004/0133793 | A1 | 7/2004 | Ginter et al. |
| 2005/0120054 | A1 | 6/2005 | Shulman et al. |
| 2005/0177715 | A1 | 8/2005 | Somin et al. |
| 2006/0075494 | A1 | 4/2006 | Bertman et al. |
| 2006/0230451 | A1 | 10/2006 | Kramer et al. |
| 2006/0282664 | A1 | 12/2006 | Zhao |
| 2006/0288420 | A1 | 12/2006 | Mantripragada et al. |
| 2007/0112714 | A1 | 5/2007 | Fairweather |
| 2007/0130621 | A1 | 6/2007 | Marinescu et al. |
| 2007/0136282 | A1 | 6/2007 | Takashima |
| 2007/0174630 | A1 | 7/2007 | Shannon et al. |
| 2007/0240218 | A1 | 10/2007 | Tuvell et al. |
| 2007/0240220 | A1 | 10/2007 | Tuvell et al. |
| 2007/0240221 | A1 | 10/2007 | Tuvell et al. |
| 2007/0240222 | A1 | 10/2007 | Tuvell et al. |
| 2008/0086773 | A1 | 4/2008 | Tuvell et al. |
| 2008/0168135 | A1 | 7/2008 | Redlich et al. |
| 2008/0177994 | A1 | 7/2008 | Mayer |
| 2008/0196104 | A1 | 8/2008 | Tuvell et al. |
| 2008/0256636 | A1 | 10/2008 | Gassoway |
| 2009/0144823 | A1 | 6/2009 | Lamastra et al. |
| 2009/0217260 | A1 | 8/2009 | Gebhart et al. |
| 2009/0319796 | A1 | 12/2009 | Kim et al. |
| 2010/0011029 | A1 | 1/2010 | Niemela |
| 2011/0116637 | A1 | 5/2011 | Schiefelbein |
| 2011/0179484 | A1 | 7/2011 | Tuvell et al. |
| 2011/0258701 | A1* | 10/2011 | Cruz .................... G06F 21/554 |
| | | | 726/23 |
| 2011/0314542 | A1 | 12/2011 | Viswanathan et al. |
| 2011/0314548 | A1 | 12/2011 | Yoo |
| 2011/0321139 | A1 | 12/2011 | Jayaraman et al. |
| 2012/0008529 | A1 | 1/2012 | Averbuch et al. |
| 2012/0023584 | A1 | 1/2012 | Yoo |
| 2012/0036572 | A1 | 2/2012 | Yoo |
| 2012/0042375 | A1 | 2/2012 | Yoo |
| 2012/0117203 | A1 | 5/2012 | Taylor et al. |
| 2012/0222123 | A1 | 8/2012 | Williams et al. |
| 2013/0073388 | A1 | 3/2013 | Heath |
| 2014/0059226 | A1 | 2/2014 | Messerli et al. |
| 2014/0181894 | A1 | 6/2014 | Bokern et al. |
| 2014/0237550 | A1 | 8/2014 | Anderson et al. |
| 2014/0283071 | A1 | 9/2014 | Spikes |
| 2014/0337234 | A1 | 11/2014 | Tang et al. |
| 2015/0156183 | A1 | 6/2015 | Beyer et al. |
| 2015/0178497 | A1 | 6/2015 | Lukacs et al. |
| 2015/0220735 | A1 | 8/2015 | Paithane et al. |
| 2015/0271139 | A1 | 9/2015 | Lukacs et al. |
| 2015/0332043 | A1 | 11/2015 | Russello |
| 2015/0379287 | A1 | 12/2015 | Mathur et al. |
| 2016/0323315 | A1* | 11/2016 | Hathaway ........... H04L 63/1491 |
| 2017/0063557 | A1 | 3/2017 | Chalmandrier-Perna |
| 2017/0068676 | A1 | 3/2017 | Jayachandran et al. |
| 2017/0177877 | A1 | 6/2017 | Suarez et al. |
| 2017/0244748 | A1* | 8/2017 | Krause .................... H04L 63/20 |

OTHER PUBLICATIONS

Kovatsch, et. al., "A RESTful Runtime Container for Scriptable Internet of Things Applications", 3rd IEEE International Conference on the Internet of Things, Oct. 2012.

Mattetti, et. al., "Securing the Infrastructure and the Workloads of Linux Containers", IEEE Conference on Communications and Network Security (CNS), 2015.

Pan, et. al., Robust Container Code Recognition System, Fifth World Congress on Intelligent Control and Automation, 2004.

Azkia, et al., "Reconciling IHE-ATNA Profile with a posteriori Contextual Access and Usage Control Policy in Healthcare Environment", 2010 Sixth International Conference on Information Assurance and Security, 2010 IEEE, pp. 197-203, Cesson, Sevigne, France.

Skillen, et al., "Mobiflage: Deniable Storage Encryption for Mobile Devices," IEEE Transaction on Dependable and Secure Computing, vol. 11, No. 3, May-Jun. 2014, 2013 IEEE, pp. 224-237, Canada.

Cziva, et al., "Container-based Network Function Virtualization for Software-Defined Networks," 2015 IEEE Symposium on Computers and Communication (ISCC), pp. 415-420, Scotland.

Ohakchianandan, et al., "Memory Efficacious Pattern Matching Intrusion Detection System", 2013 International Conference on Recent Trends in Information Technology (ICRTIT), pp. 652-656, Anna University, Chennai, India.

Guenane, et al, "Autonomous Architecture for Managing Firewalling Cloud-Based Service," 2014 International Conference and Workshop on the Network of the Future (NOF), Paris, France, pp. 1-5.

Rehak, et al., "Adaptive Multiagent System for Network Traffic Monitoring," IEEE Intelligent Systems, vol. 24, Issue: 3, 2009, Czechia, pp. 17-25.

Shouman, et al., "Surviving Cyber Warfare With a Hybrid Multiagent-based Intrusion Prevention System," IEEE Potentials, vol. 29, Issue: 1, 2010, pp. 32-40.

Song, et al., "A Control Theoretical Approach for Flow Control to Mitigate Bandwidth Attacks," 2006 IEEE Information Assurance Workshop, West Point, NY, pp. 348-360.

Van Niekerk, et al., "Cloud-Based Security Mechanisms for Critical Information Infrastructure Protection," 2013 International Conference on Adaptive Science and Technology, South Africa, pp. 1-4.

Wang, et al., "Transport-Aware IP Routers: A Built-in Protection Mechanism to Counter DDoS Attacks," IEEE Transactions on Parallel and Distributed Systems, vol. 14, Issue: 9, pp. 873-884, Sep. 2003.

(56) References Cited

OTHER PUBLICATIONS

Zhauniarovich, et al., "Moses: Supporting and Enforcing Security Profiles on Smartphones," IEEE Transactions on Dependable and Secure Computing, vol. 11, Issue: 3, pp. 211-223, 2014.
Cooper, et al., "Internet X.509 Public Key Infrastructure Certificate and Certificate Revocation List (CRL) Profile", May 2008, pp. 151.
Housley, et. al., "Internet X 509 Public Key Infrastructure Certificate and Certificate Revocation List (CRL) Profile", Apr. 2002, pp. 259.
Schneier, Bruce., "Economics of Information Security and Privacy III", 2013, pp. 73-109.
Balazsi, et al., "Software System for Broadcasting and Monitoring Traffic Information", 2014 IEEE 12th International Symposium on Intelligent Systems and Informatics (SISY), 2014, pp. 39-42, Subotica, Serbia.
Jing, et al., "A Context-aware Disaster Response System Using Mobile Software Technologies and Collaborative Filtering Approach", 2014 IEEE 18th International Conference on Computer Supported Cooperative Work in Design, 2014, pp. 516-522, China.

\* cited by examiner

RUNTIME DETECTION OF VULNERABILITIES IN SOFTWARE CONTAINERS

CROSS-REFERENCE TO RELATED APPLICATIONS

This patent application claims priority from U.S. Provisional Patent Application No. 62/235,644 filed on Oct. 1, 2015 and U.S. Provisional Patent Application No. 62/235,641 filed on Oct. 1, 2015, the contents of which are hereby incorporated by reference.

TECHNICAL FIELD

The present disclosure generally relates to cybersecurity systems, and more particularly to detection of malicious code and activity in software containers.

BACKGROUND

A software container is an instance of a user-space running an application within the operating system (OS) of a host device (e.g., a server). Software containers enable operating-system-level virtualization in which the OS kernel allows the existence of multiple isolated software containers.

A software container (or a container) provides an executable environment with a complete filesystem. The filesystem may contain code, runtime, system tools, system libraries, and so on. That is, execution of a software container can be the same regardless of the underlying infrastructure. A Docker is one of the popular existing platforms for creating, migrating, managing, and deploying software containers.

A software container, unlike a virtual machine, does not require or include a separate operating system. Rather, the container relies on the kernel's functionality and uses hardware resources (CPU, memory, I/O, network, etc.) and separate namespaces to isolate the application's view of the operating system. A software container can access the OS kernel's virtualization features either directly or indirectly. For example, Linux kernel can be accessed directly using the libcontainer library or indirectly using the libvirt service.

A demonstrated in FIG. 1, a number of software containers (i.e., the app containers 110-1 through 110-n, hereinafter referred to individually as a container 110, merely for simplicity purposes) can access and share the same OS kernel 120. However, each container 110 can be constrained to only use a defined amount of hardware resources (e.g., CPU, memory, etc.) in the underlying hardware layer 130. Thus, using software containers, hardware resources can be isolated, services can be restricted, and processes can be provisioned to have an almost completely private view of the operating system with their own process ID space, file system structure, and network interfaces.

FIG. 2 illustrates a typical structure of a software container 200. The software container 200 includes a base image 210 and a container layer 220. The base image 220 includes one or more image layers 215-1 through 215-q (hereinafter referred to individually as a layer 215 and collectively as layers 215, merely for simplicity purposes). The layers 215 are read-only layers that represent filesystem differences. That is, the layers 215 are stacked on top of each other to form a base for the container's 200 root filesystem. The layers 215 are read only, and each layer 215 is identified by a randomly generated identifier number of a checksum computed using a hash function.

The base image 210 (and its layers 215) can be shared across different software containers. Thus, only the container layer 220 differentiates between one software container and another. The container layer 220 is a readable and writable layer where all data written to the software container 200 are saved in the container layer 220. When the software container 200 is deleted, the writable container layer 220 is also deleted, and the base image 210 remains unchanged. As such, the multiple software containers 200 can share access to the same base image 210, each of which has its own data state. In the example demonstrated in FIG. 2, the software container 200 is a Docker container (e.g., compliant with the Docker platform).

The popularity of software containers has been increased due to the easy integration with cloud-computing platform (e.g., Amazon® Web Services, Google® Cloud Platform, Microsoft® Azure, etc.). On such platforms, service providers can offer operating systems to run services and applications. With that said, the increasing reliance on software containers increases the need for secured execution.

Various cyber-attacks can be carried out through the execution of a software container. Examples for such cyber-attacks include advanced persistent threats (APTs), zero day attacks, denial-of-service (DoS) or distributed DoS (DDoS) attacks, and so on. An APT attack can cause, for example, data leakage. Zero-day attacks can cause, for example, intrusion of malware to the organization, such as viruses, ransomware, spyware, and the like.

Each software container (and, thus, each application) can be secured separately from other software containers (and applications). Thus, one software container cannot access resources of other software containers. However, the isolation of software containers cannot prevent the execution of malicious code. Malicious activity by software containers can occur through exploitation of legitimate programs or services in a container and improper configuration. Improper configuration may result in, for example, privilege escalations.

Exploitation of legitimate programs may include utilization of named objects created by such programs to perform malicious activity. Typically, a named object can be used for inter-process communication, process synchronization, and the like. Malware, for example, can be programmed to preemptively create a named object before a legitimate program has the opportunity to create one. The malware can exploit the created object to propagate malicious code, leak confidential information, initiate a DoS attack, and so on. Detection of such vulnerabilities occur at runtime only, i.e., during the execution of the software containers.

Another vulnerability is resulted due to sharing the OS kernel 120 among all containers 110 on the same host. This may allow a malicious container to infect or alter a container through the OS kernel 120. Furthermore, malwares can be populated to the containers 110 through the OS kernel 120.

Existing security solutions are not designed to detect such malicious software containers. Such solutions are designed to protect the organization's infrastructure (servers, networks, etc.) against cyber-attacks carried out by external sources. However, existing security solutions are not designed to detect or monitor the operation of software containers, which are an integral part of the organization's infrastructure and are required to carry the organization's applications. Further, such solutions are not designed to detect vulnerabilities in software containers during runtime. For example, an IDS can detect a malware intrusion to a server that is part of the organization's infrastructure from an external source, but the IDS cannot detect any virus/malware intrusion caused by execution of a software container by the server. Such a container is deployed in the server in a legitimate manner. The fact that most software containers are initially hosted in and provided by third party repositories increases vulnerabilities associated with such containers.

It would therefore be therefore advantageous to provide a solution that would secure the execution of software containers.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for detecting vulnerabilities in software containers at runtime. The method comprises intercepting a request to instantiate a new software container in a first execution environment; creating a second execution environment; migrating the new software container from the first execution environment to the second execution environment for execution therein; monitoring the operation of the new software container in the second execution environment to detect at least one unauthorized action; and upon detection of the at least one unauthorized action, generating a detection event identifying at least a type of vulnerability associated with the detected unauthorized action.

Some embodiments disclosed herein include a non-transitory computer readable medium having stored thereon instructions for causing a processing system to execute a process for detecting vulnerabilities in software containers during runtime at runtime. The process includes intercepting a request to instantiate a new software container in a first execution environment; creating a second execution environment; migrating the new software container from the first execution environment to the second execution environment for execution therein; monitoring the operation of the new software container in the second execution environment to detect at least one unauthorized action; and upon detection of the at least one unauthorized action, generating a detection event identifying at least a type of vulnerability associated with the detected unauthorized action.

Some embodiments disclosed herein include a host device for detecting vulnerabilities in software containers at runtime. The host device comprises a processing system; and a memory, the memory containing instructions that, when executed by the processing system, configure the host device to: intercept a request to instantiate a new software container in a first execution environment; create a second execution environment; migrate the new software container from the first execution environment to the second execution environment for execution therein; monitor the operation of the new software container in the second execution environment to detect at least one unauthorized action; and upon detection of the at least one unauthorized action, generate a detection event identifying at least a type of vulnerability associated with the detected unauthorized action.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
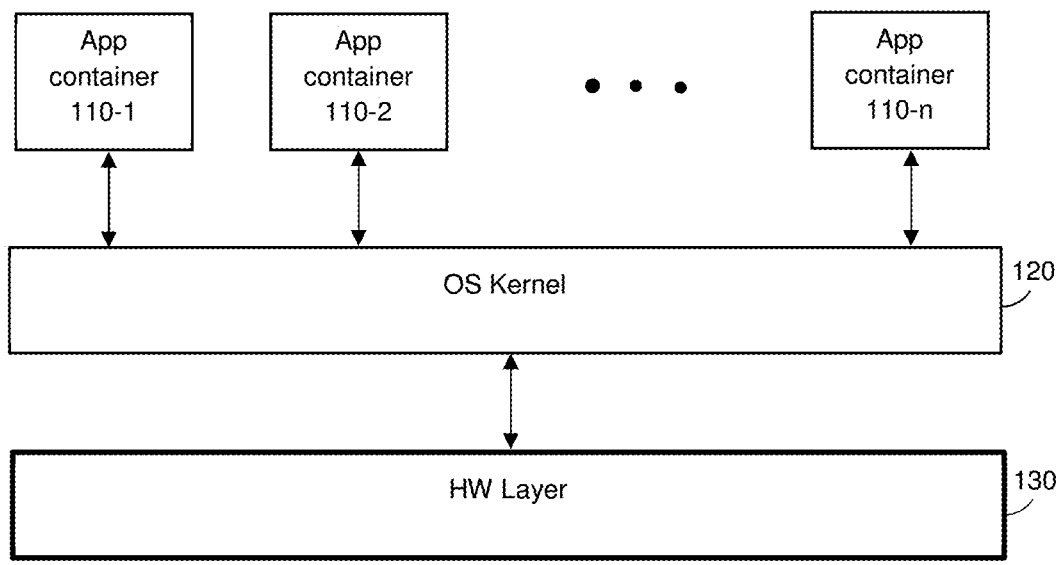
FIG. 1 is a diagram illustrating of execution of a plurality of software containers.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example, the various disclosed embodiments include techniques for detecting vulnerabilities in software containers at runtime. The detected vulnerabilities include known and unknown vulnerabilities. Known vulnerabilities can be classified as known threats having identified signatures or patterns. For example, signatures of viruses, malwares, zero-day worms, attacks having unknown patterns, and the like are considered as known vulnerabilities. Unknown vulnerabilities are classified as unauthorized actions performed by a software container at runtime. In an embodiment, detection of unknown vulnerabilities is performed in a quarantined environment, thereby protecting the host device from being harmed by any unauthorized and potentially malicious action performed by a software container.

Figure 3:
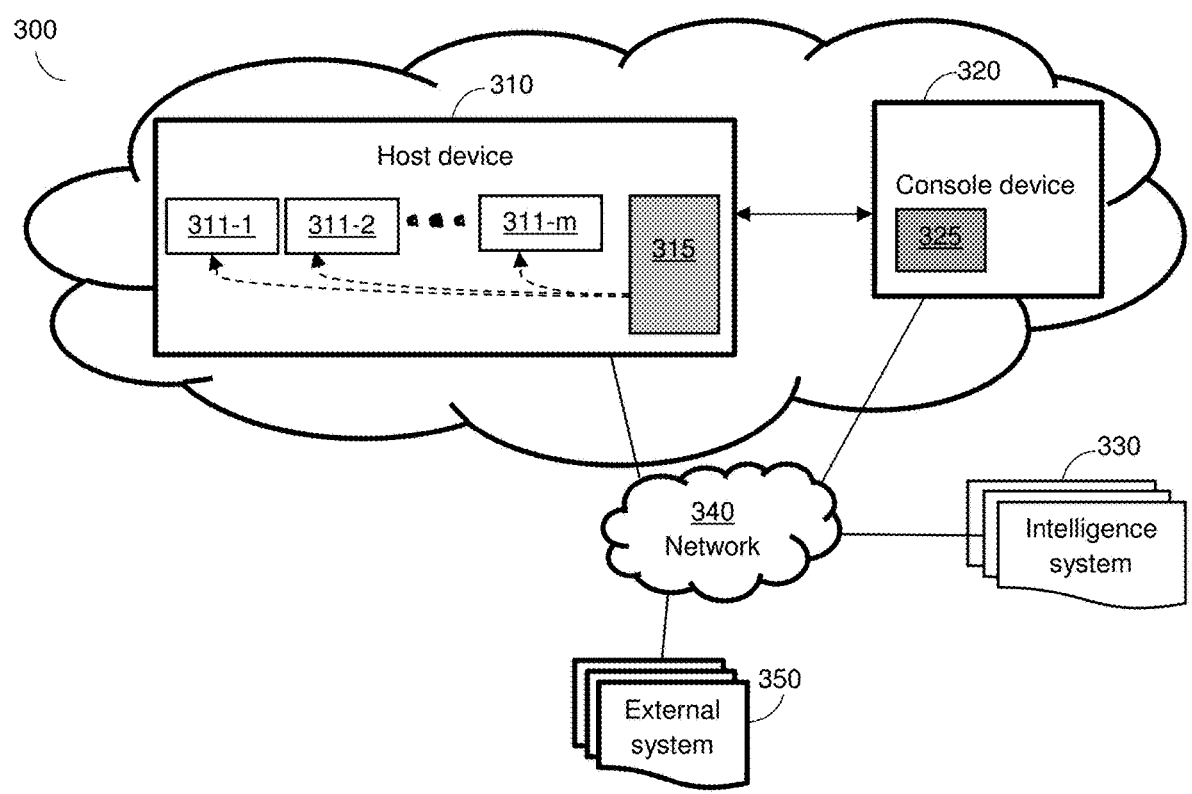
FIG. 3 is a network diagram utilized to describe the various disclosed embodiments.

FIG. 3 is an example network diagram 300 utilized to describe the various embodiments for runtime detection of vulnerabilities in software containers. A host device 310 is communicably connected to a console device 320. Each of the devices 310 and 320 can be realized as a physical machine, a virtual machine, or a cloud-computing infrastructure (IaaS). Examples for such an infrastructure include, but are not limited to, Amazon Web Services (AWS), Cisco® Metapod, Microsoft Azure®, Google® Compute Engine (GCE), Joyent®, and the like.

The devices 310 and 320 may be deployed in a datacenter, a cloud computing platform (e.g., a public cloud, a private cloud, or a hybrid cloud), on-premises of an organization, or in a combination thereof. It should be noted that the devices 310 and 320 can be deployed in different geographical locations.

The host device 310 is configured to host and execute a plurality of software containers 311-1 through 311-m where 'm' is an integer equal to or greater than 1 (collectively referred to hereinafter as APP containers 311 or individually as an APP container 311, merely for simplicity purposes). Each APP container 311 is a software container configured to execute a specific application (APP).

According to the disclosed embodiments, the host device 310 is configured to host and execute a detector container 315. The detector container 315 is a software container designed to detect vulnerabilities in any APP container 311. The operation of the detector container 315 for detecting vulnerabilities will be discussed in more detail herein below. In an embodiment, the detector container 315 is configured to intercept any communication in to or out of an APP container 311. To this end, the detector container 315 may act as a proxy to the APP container 311. For example, in a Docker architecture, the detector container 315 may proxy any communication between the client and daemon programs of an APP container 311. The intercepted communications may include, for example, system calls, access to a filesystem, access to a virtual machine hosting the APP container, access to a communication port, inbound and outbound network traffic, and so on. Each intercepted communication is analyzed to detect known and unknown vulnerabilities at runtime.

The console device 320 also interfaces with one or more intelligence systems 330 through a network 340. The intelligence systems 330 may include common vulnerabilities and exposures (CVE®) databases, reputation services, security systems (providing feeds on discovered threats), and so on. The information provided by the intelligence systems 330 is utilized to detect known vulnerabilities in an APP container 311.

In an optional deployment, the console device 320 also interfaces with one or more external systems 350 through the network 340. Examples for such systems 350 may include, but are not limited to, an active directory of an origination to retrieve user permissions, access control systems (e.g., Docker Swarm, and Kubernetes management plane), SIEM systems to report on detected vulnerabilities, audit and compliance systems, and the like.

In an embodiment, the console device 320 is configured to host and execute at least one console container 325. The console container 325 is a software container that interfaces with the detector container 315. Specifically, the console container 325 is designed to report the intelligence information from the systems 330 or any relevant data provided (e.g., access control, permission, etc.) to the detector container 315. The console container 325 is further configured to receive events on detected vulnerabilities from the detector container 315 and to report such events to a SIEM system or to a system administrator. In an embodiment, the events may be displayed on a GUI rendered by the console container 325 or on a GUI connected to the console device 320.

The network 340 may be the Internet, the world-wide-web (WWW), a local area network (LAN), a wide area network (WAN), a metro area network (MAN), and other networks. It should be noted that the connection between the host device 310 and the console device 320 can be facilitated over a network, such as the network 340.

Figure 2:
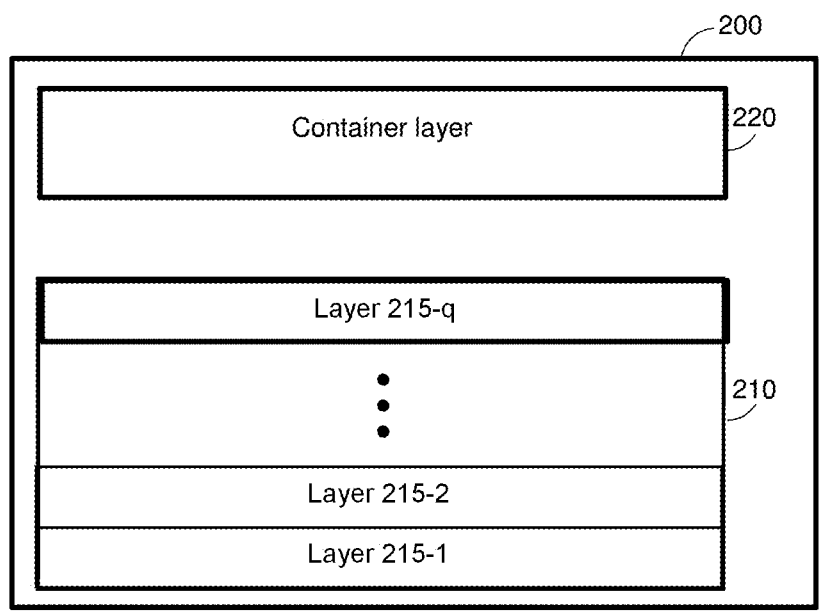
FIG. 2 is a diagram illustrating a structure of a software container.

According to the disclosed embodiments, the detector container 315 is configured to detect known vulnerabilities in an APP container 311 by monitoring any changes made to a layer of the APP container 311. As discussed above, only a top layer (e.g., container layer 220, FIG. 2) in any software container is writable. The base image (e.g., an image 210, FIG. 2) cannot and should not be modified at runtime.

In an embodiment, in order to detect vulnerabilities of a specific APP container (e.g., the container 311-1), any file that has been added, modified, or both, at the top layer of the APP container 311-1 is retrieved. Such retrieval can be achieved through, for example, filesystem events (e.g., using fanotify Linux® component). In another embodiment, vulnerabilities are detected in files written outside of the filesystem of a software container. For example, files written to volumes mounted to a software container by the top layer of the container. Any change made to such a file would trigger an event that would cause for inspection of the file.

Each new file or modified file is inspected for known vulnerabilities based on the received intelligence information. As an example, any new or modified file can be inspected to check if it includes a signature of a malware. As intelligence information are provided in part from CVE databases, the file scanning provides a defense against zero-day attacks and vulnerability in real-time as the files are detected. It should be noted that a file may include an object, a data block, a data structure, or combination thereof, and the like.

It should be noted that the inspection of files is performed at runtime as the top layer of the container is modified. It should be further noted that the inspection can be performed as long as changes are detected, new intelligence information is received, or both. Further, intelligence information is pushed to the detector container 315 as they are received.

Upon detection of a file infected by a known vulnerability, a detection event is generated and reported to the console device 320. Such an event may include a container identifier, a name of the infected file, a type of the detected vulnerability, and so on. In an embodiment, one or more mitigation actions can be executed when a detection event has been generated. Such a mitigation action may include, for example, halting the operation of the APP container, quarantining the APP container or the infected file, and so on. As mentioned above, the console device 320, by means of the console container 325, may cause the display of the detection event, of a report, or both, to a SEIM device.

According to the disclosed embodiments, detection of unknown vulnerabilities is performed on each APP container 311 when the APP container 311 is executed. To this end, the detector container 315 is configured to monitor system calls indicative of instantiation, running, or both, of a new APP container (e.g., the container 311-2). Then, such an APP container 311-2 is migrated into a quarantined environment. The execution of APP container 311-2 in the quarantined environment is monitored to detect any unauthorized actions performed by the container 311-2. The operation of the detector container 325 when detecting unknown vulnerabilities is further discussed herein below with respect to FIG. 4.

Figure 4:
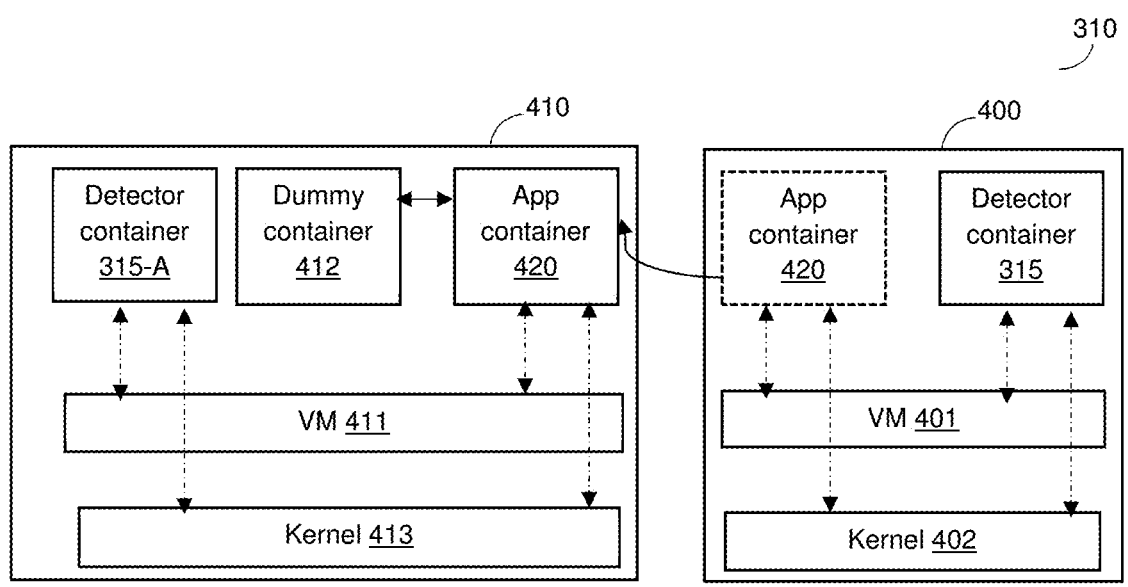
FIG. 4 is a diagram illustrating safe and quarantined execution environments for detecting unknown vulnerabilities according to an embodiment.

FIG. 4 shows an example host device 310 with a safe execution environment 400 and a quarantined environment 410. The safe execution environment 400 is configured to host and run the detector container 315 in a VM 401 over an OS Kernel 402. The quarantined environment 410 is instantiated and created by the detector container 315-A. The quarantined environment 410 includes a virtual machine (VM) 411 and a dummy container 412 both executed over an OS kernel 413. The dummy container 412 is a software container designed to trap any attempt to infect other containers executed in the same environment with a malicious code generated by an APP container. In an embodiment, the quarantined execution environment 410 also includes an instant of the detector container 315-A, utilized to detect any vulnerability through the operation of the APP container 420 in the quarantined execution environment 410.

Upon detection of a new instance of the APP container 420 in the safe execution environment 400, the detector container 315 is configured to migrate the APP container 420 to the quarantined environment 410. In an embodiment, the migration includes exporting the APP container 420 together with all of its context and metadata to the environment 410. The APP container's 420 state including networking and storage are preserved during the migration.

In the quarantined execution environment 410, the detector container 315-A is configured to monitor the operation of the APP container 420. This includes intercepting any communication in and out the APP container 420 and determining, based on the intercepted communication, if any unauthorized action is attempted to be performed by the APP container 420. A list of actions considered as unauthorized may be predefined and dynamically updated. Such actions may include, but are not limited to, accessing the VM 411, system calling the OS kernel 413, accessing the dummy container 412, reading or writing from the filesystem (not shown), opening a connection port (not shown), accessing an external network address (e.g., a URL or IP address), and so on. As a non-limiting example, an attempt to access the usr/bin library by the APP container 420 may be determined as an unauthorized action. As another embodiment, accessing a URL associated with an unreportable website may be determined as an unauthorized action. As yet another example, opening a port designated as port 22 would be considered as an unauthorized action.

Upon detection of an unauthorized action by the APP container 420, a detection event is generated and reported to the console device 320 (FIG. 3). In addition, one or more mitigation actions can be performed. Such mitigation actions may include halting the operation of the APP container 420, halting a specific malicious process executed by the APP container 420 that causes the vulnerability, and so on.

If should be appreciated that detecting unknown vulnerabilities in the quarantined environment 410 allows for stopping the propagation of, for example, malware by a malicious APP container. Such attempts to infect other containers executed in the same environment with a malicious code will be trapped by the dummy container 420.

It should be further noted that the safe execution environment 400 is isolated from the quarantined environment 410. Thus, any malicious activity performed by the APP container 420 would not affect the safe execution environment 400. The safe execution environment 400 and the quarantined environment 410 may be created on the same host device or on different host devices.

In an embodiment, if no vulnerability is detected after execution of the APP container 420 in the quarantined environment 410 for a predefined time period, the APP container 420 is migrated back to the safe execution environment 400 for execution therein. Then, the quarantined environment 410 is deleted. This process is controlled and orchestrated by the detector container 325-A.

Returning to back FIG. 3, the embodiments disclosed herein are not limited to the specific architecture illustrated in FIG. 3 and other architectures may be used without departing from the scope of the disclosed embodiments. Specifically, the console container 325 may reside in the host device 310. Further, in an embodiment, there may be a plurality of detector containers 315 operating as described hereinabove and configured to either have one as a standby, to share loads between them, or to split the functions between them. In addition, other software containers or processes that handle the management and configuration of the APP containers 311, the detector container 315, the console container 325, or a combination thereof, may be hosted in the devices 310 and 320. Examples for such software containers or processes may include a Docker engine, a networking container, drivers, and so on.

Figure 5:
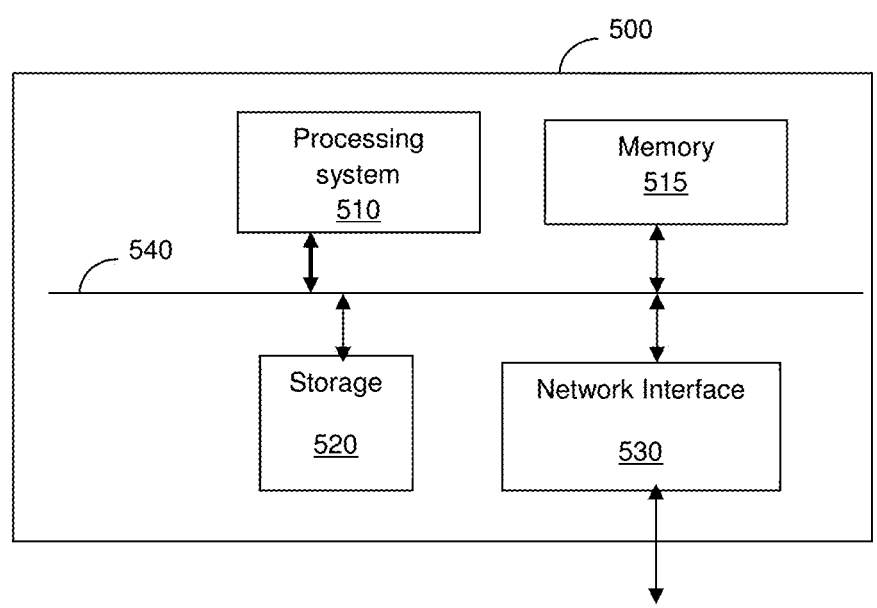
FIG. 5 is a block diagram of a hardware layer in host devices utilized to execute at least a detector container and a console container according to an embodiment.

It should be appreciated that each device 310 and 320 requires an underlying hardware layer to execute the OS, VMs, and software containers. An example block diagram of a hardware layer 500 is shown in FIG. 5. The hardware layer 500 includes a processing system 510, a memory 515, a storage 520, and a network interface 530, all connected to a computer bus 540.

The processing system 510 may be realized by one or more hardware logic components and circuits. For example, and without limitation, illustrative types of hardware logic components that can be used include Field Programmable Gate Arrays (FPGAs), Application-specific Integrated Circuits (ASICs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory may be volatile, non-volatile, or a combination thereof. The storage may be magnetic storage, optical storage, and the like.

In one configuration, computer readable instructions to implement one or more embodiments disclosed herein may be stored in the storage. The storage may also store other computer readable instructions to implement an operating system, an application program, and the like. Computer readable instructions may be loaded in the memory for execution by the processing system 510.

In another embodiment, the storage 520, the memory 515, or both, are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 510 to perform the various functions described herein with respect to at least detection of vulnerabilities.

The network interface 530 allows communication with other external systems or host devices through a network (e.g., the network 340). The network interface 530 may include a wired connection or a wireless connection. The network interface 530 may transmit communication media, receive communication media, or both. The computer bus 540 may be, for example, a PCIe bus.

Figure 6:
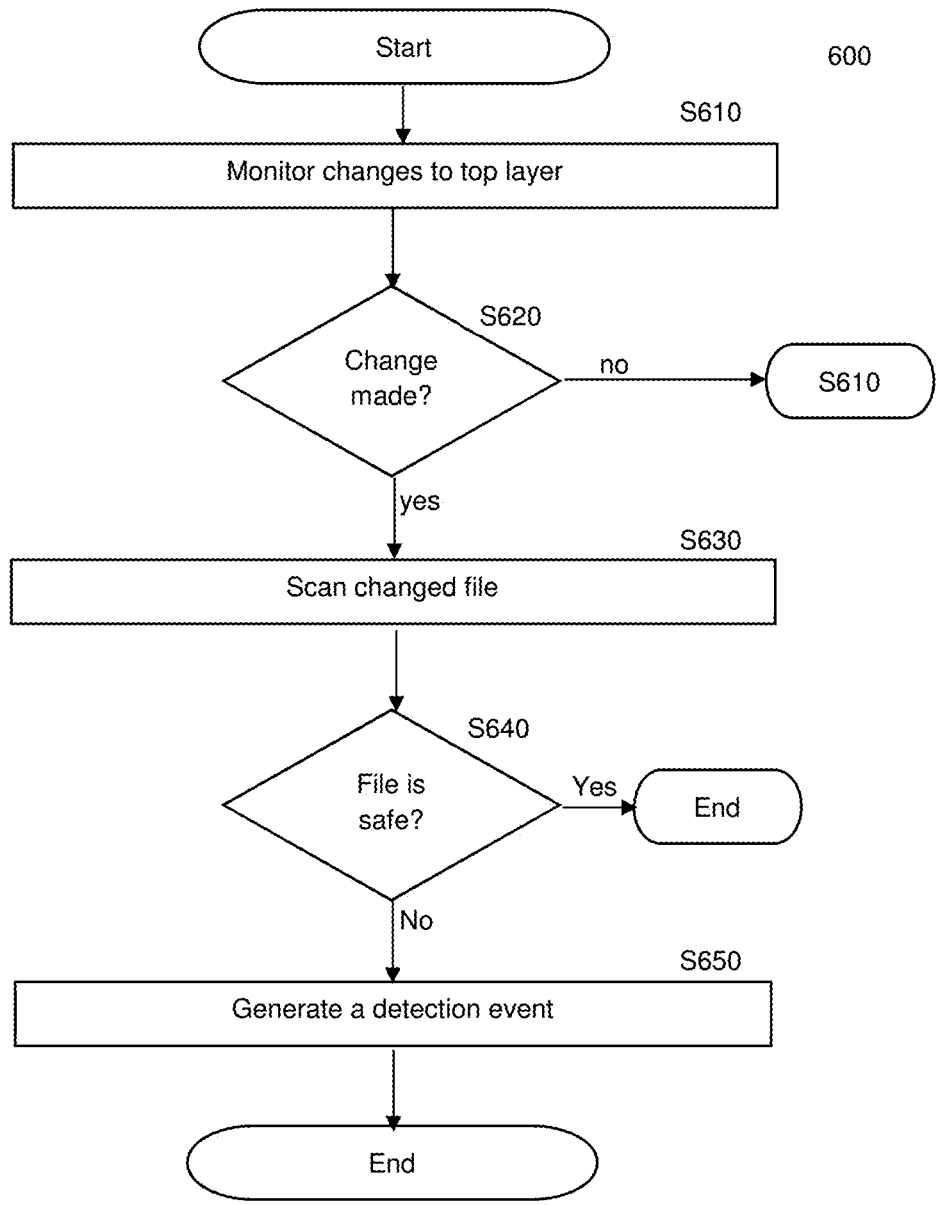
FIG. 6 is a flowchart illustrating a method for detecting known vulnerabilities in software containers at runtime according to an embodiment.

FIG. 6 shows an example flowchart 600 illustrating a method for detecting known vulnerabilities in software containers during runtime according to an embodiment. At S610, events triggered as a result of changes to the top (application) layer of an APP container are monitored. Such events include at least filesystem events and mounted volumes events.

At S620, it is determined if a change to the top layer and/or to a mounted volume map to a directory structure within the APP container has been made. As an example, such a change may include modifying a file or writing a new file in the top layer. A file may include a file, an object, a data block, and the like. If S620 results with a Yes answer, execution continues with S630; otherwise, execution returns to S610.

At S630, the changed (new or modified) file is scanned for known vulnerabilities. Such vulnerabilities may include previously known or newly discovered malware, or any modified version of previously known or newly discovered malware. Malware may include, for example, computer viruses, worms, Trojan horses, ransomware, spyware, adware, scareware, and other programs or processes executing malicious code.

In an embodiment, the scanning is performed based on intelligence information received from the console container (e.g., the console container 325). Such information includes definitions of known vulnerabilities such as, but not limited to, signatures of viruses or worms, or any viruses, worms, spyware, or any type of malware. Thus, in this embodiment, the file is inspected to determine if the file contains, for example, a signature of a known or newly discovered malware. In another embodiment, the scanning of the changed file is also based on one or more heuristics or behavior patterns of malicious programs. This allows for detection of known malware in any modified versions.

At S640, it is checked if the changed file is safe, i.e., if no vulnerability was detected. If so, execution ends; otherwise, execution continues with S650. It should be noted that the evaluation of newly modified or new files can be performed in the same manner described herein as long as the changes are made to the top layer of an APP container.

At S650, a detection event is generated and sent to the console container. The detection event may designate, for example, a container identified, a name of the infected file, a type of the detected vulnerability, and so on. In an embodiment, one or more mitigation actions can be executed in response to the detection event. Such an action may include, for example, halting the operation of the app container, quarantining the APP container or the infected file, and so on.

Figure 7:
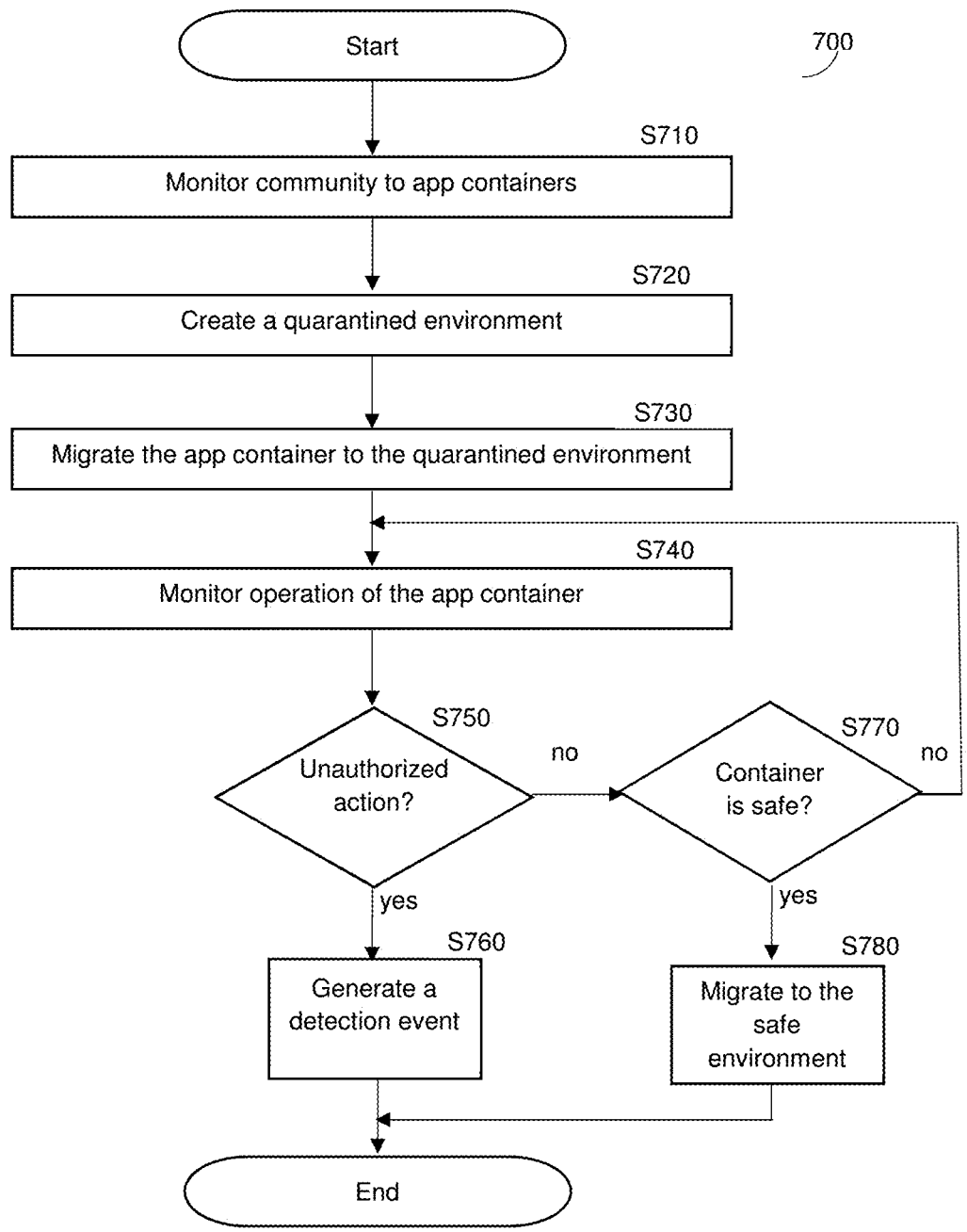
FIG. 7 is a flowchart illustrating a method for detecting known vulnerabilities in software containers at runtime according to an embodiment.

FIG. 7 shows an example flowchart 700 illustrating a method for detecting vulnerabilities in software containers during runtime according to an embodiment. At S710, a request to instantiate and execute a new APP container is intercepted. In an embodiment, the interception is performed by a detector container that monitors all communication between APP containers executed in a first (e.g., safe) execution environment.

At S720, a quarantined execution environment is created. This creation includes, for example, launching an OS Kernel, instantiating a VM, and generating/instantiating a dummy container and a detector container to be executed over the VM. As noted above, the dummy container is also a software container.

At S730, the new APP container is migrated to the quarantined execution environment for running therein. At S740, the operation of the new APP container in the quarantined execution environment is monitored to detect any attempt to perform any unauthorized actions. As noted above, an unauthorized action may include accessing the VM, system calling the OS kernel, accessing the dummy container, reading to or writing from the filesystem (not shown), opening a connection port (not shown), accessing an external network address (e.g., URL or IP address), and so on.

At S750, it is checked if an unauthorized action was detected. If so, execution continues with S760; otherwise, execution continues with S770. At S760, a detection event is generated and sent to a console container. The detection event may designate a container identifier, a type of the detected vulnerability, a process causing the detected vulnerability, and so on. In an embodiment, one or more mitigation actions can be executed in response to the detection. Such a mitigation action may include, for example, halting the operation of the new APP container or a process causing the detected vulnerability At S770, it is checked if the new APP container is safe and, if so, execution continues with S780; otherwise, execution continues with S740. A container is determined safe after running in the quarantined execution environment without any monitored attempt to create an unauthorized action for a predefined time period of time (e.g., 24 hours).

In certain embodiments, the operation of a software container executed in a safe environment may be monitored. Upon detection of an attempt to perform an authorized action, such a software container may be migrated to the quarantined execution environment for a further inspection.

It should be emphasized that the detection of the known and unknown vulnerabilities can work in synergy to provide a comprehensive defense when executing software containers. For example, to mitigate an APT attack, both known and unknown vulnerabilities should be detected. That is, as an example, a hacker discovering a remote code execution vulnerability in one of the company's software containers pushes malicious code to be executed as part of the software container. The malicious code is designed to open a network connection with a remote server to download an agent. Such an attempt would be detected by the defender container quarantined environment.

If such an attempt what was not detected, a malicious agent will be downloaded and stored to a storage of the host device. However, such a download will be detected as any changes to the filesystem are monitored and scanned. That is, the agent executable file will be scanned for malicious code. Further, any malicious activity performed by such agent will be monitored at runtime when the container (executing such an agent) is executed in the container quarantined environment.

The various embodiments have been discussed herein with a reference to software containers. A software container provides an executable environment with a complete filesystem. A software container may include a micro-service, a Docker container, a light virtual machine, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting vulnerabilities in software containers at runtime, comprising:
    intercepting a request to instantiate a new software container in a first execution environment;
    creating a second execution environment, wherein the second execution environment is separated from the first execution environment, wherein the second execution environment includes a dummy software container and a detector software container, wherein the dummy software container is configured to trap an attempt to infect other software containers with a malicious code generated by the new software container;
    migrating the new software container from the first execution environment to the second execution environment for execution therein;
    intercepting, by the detector software, communications between the new software container and the dummy software container in the second execution environment;
    monitoring the operation of the new software container in the second execution environment to detect at least one unauthorized action, wherein the monitoring further comprises determining that the at least one unauthorized action has been attempted based on the intercepted communications between the new software container and the dummy container in the second execution environment; and
    upon detection of the at least one unauthorized action, generating a detection event identifying at least a type of vulnerability associated with the detected unauthorized action.

2. The method of claim 1, further comprising:
    migrating the new software container back to the first execution environment if the at least one unauthorized action has not been detected after a predefined time interval.

3. The method of claim 1, further comprising:
    upon detection of the at least one unauthorized action, performing at least one mitigation action.

4. The method of claim 3, wherein the mitigation action includes at least any one of: a container identifier, a type of the detected vulnerability, a process causing the detected vulnerability.

5. The method of claim 1, wherein creating the second execution environment further comprises:
    instantiating a virtual machine, an operating system kernel, the dummy software container, and the detector software container.

6. The method of claim 5, wherein the first execution environment and the second execution environment are hosted in any one of: the same host device and different host devices.

7. The method of claim 1, wherein monitoring the operation of the new software container further comprises:
    listening to any communication between a client component and a daemon component of the new software container.

8. The method of claim 1, wherein the new software container is configured to execute a dedicated application.

9. The method of claim 1, wherein the at least one unauthorized action includes a list of actions that are likely to cause malicious activity by the new software container.

10. The method of claim 9, wherein the at least one unauthorized action includes at least any one of: accessing a virtual machine in the second execution environment, system-calling an operating system kernel in the second execution environment, accessing a dummy software container in the second execution environment, reading to or writing from a filesystem of the new software container, opening a connection port, and accessing an external network address.

11. The method of claim 1, wherein generating the detection event further comprises:
    reporting the detection event to a console device for informing external security systems and displaying the detection event.

12. The method of claim 1, further comprising:
    monitoring the operation of a software container in the first execution environment; and
    upon detecting an attempt to perform an unauthorized action in the first execution environment, migrating the software container to the second execution environment.

13. A non-transitory computer readable medium having stored thereon instructions for causing a processing system to execute a process for detecting vulnerabilities in software containers during runtime at runtime, the process comprising:
    intercepting a request to instantiate a new software container in a first execution environment;
    creating a second execution environment, wherein the second execution environment is separated from the first execution environment, wherein the second execution environment includes a dummy software container and a detector software container, wherein the dummy software container is configured to trap an attempt to infect other software containers with a malicious code generated by the new software container;

migrating the new software container from the first execution environment to the second execution environment for execution therein;

intercepting, by the detector software, communications between the new software container and the dummy software container in the second execution environment;

monitoring the operation of the new software container in the second execution environment to detect at least one unauthorized action, wherein the monitoring further comprises determining that the at least one unauthorized action has been attempted based on the intercepted communications between the new software container and the dummy container in the second execution environment; and upon detection of the at least one unauthorized action, generating a detection event identifying at least a type of vulnerability associated with the detected unauthorized action.

14. A host device for detecting vulnerabilities in software containers at runtime, comprising:

a processing system; and a memory, the memory containing instructions that, when executed by the processing system, configure the host device to:

intercept a request to instantiate a new software container in a first execution environment;

create a second execution environment, wherein the second execution environment is separated from the first execution environment, wherein the second execution environment includes a dummy software container and a detector software container, wherein the dummy software container is configured to trap an attempt to infect other software containers with a malicious code generated by the new software container;

migrate the new software container from the first execution environment to the second execution environment for execution therein;

intercept, by the detector software, communications between the new software container and the dummy software container in the second execution environment;

monitor the operation of the new software container in the second execution environment to detect at least one unauthorized action, wherein the monitoring includes determining that the at least one unauthorized action has been attempted based on the communications between the new software container and the dummy software container in the second execution environment; and upon detection of the at least one unauthorized action, generate a detection event identifying at least a type of vulnerability associated with the detected unauthorized action.

15. The host device of claim 14, wherein the host device is further configured to: migrate the new software container back to the first execution environment if the at least one unauthorized action has not been detected after a predefined time interval.

16. The host device of claim 14, wherein the host device is further configured to:

upon detection of the at least one unauthorized action, perform at least one mitigation action.

17. The host device of claim 16, wherein the mitigation action includes at least any one of: a container identifier, a type of the detected vulnerability, a process causing the detected vulnerability.

18. The host device of claim 15, wherein the host device is further configured to:

instantiate a virtual machine, an operating system kernel, the dummy software container, and the detector software container.

19. The host device of claim 15, wherein the host device is further configured to:

listen to any communication between a client component and a daemon component of the new software container.

20. The host device of claim 14, wherein the new software container is configured to execute a dedicated application.

21. The host device of claim 14, wherein the at least one unauthorized action includes a list of actions that are likely to cause malicious activity by the new software container.

22. The host device of claim 21, wherein the at least one unauthorized action includes at least any one of: accessing a virtual machine in the second execution environment, system calling an operating system kernel in the second execution environment, accessing a dummy software container in the second execution environment, reading to or writing from a filesystem of the new software container, opening a connection port, and accessing an external network address.

23. The host device of claim 14, wherein the host device is further configured to:

report the detection event to a console device for informing external security systems and displaying the detection event.

24. The host device of claim 14, wherein the host device is further configured to:

monitor the operation of a software container in the first execution environment; and upon detecting an attempt to perform an unauthorized action in the first execution environment, migrating the software container to the second execution environment.

25. The host device of claim 14, wherein the host device is realized as any one of: a physical machine and a cloud-computing infrastructure.

* * * * *